United States Patent [19]
Albertson et al.

[11] Patent Number: 5,644,930
[45] Date of Patent: Jul. 8, 1997

[54] MECHANICAL PRESSURE RELIEF VALVE HAVING A VARIABLE POSITION OUTLET

[76] Inventors: Luther D. Albertson, 3934 Carver St., New Albany, Ind. 47150; Walter R. Key, 6362 Minlo Dr., Indianapolis, Ind. 46227; Mark B. Key, 526A Paradise Way West, Greenwood, Ind. 46143

[21] Appl. No.: 414,292

[22] Filed: Mar. 31, 1995

Related U.S. Application Data

[63] Continuation-in-part of Ser. No. 288,814, Aug. 11, 1994, Pat. No. 5,577,389.

[51] Int. Cl.⁶ .............................. F25B 43/04; F16L 17/00
[52] U.S. Cl. ............................ 62/475; 251/150; 285/374; 285/404
[58] Field of Search ............................... 285/404, 374; 251/148, 150; 62/475

[56] References Cited

U.S. PATENT DOCUMENTS

| | | | |
|---|---|---|---|
| 2,587,475 | 2/1952 | Hudson | 285/374 X |
| 3,155,271 | 11/1964 | Summers et al. | 137/71 X |
| 3,960,206 | 6/1976 | Baxter et al. | 165/61 |
| 4,819,683 | 4/1989 | Buffham et al. | 137/71 |
| 5,153,396 | 10/1992 | Cummings | 200/83 Q |
| 5,187,953 | 2/1993 | Mount | 62/195 |
| 5,259,204 | 11/1993 | McKeown | 62/174 |

FOREIGN PATENT DOCUMENTS 1389048  4/1975  United Kingdom ............ 251/148

*Primary Examiner*—William E. Wayner
*Attorney, Agent, or Firm*—Woodard, Emhardt, Naughton Moriarty & McNett

[57] ABSTRACT

A pressure relief valve that is rotatable relative to the pressure relief system to allow flexibility in the connection of an outlet aperture in the pressure relief valve with a vent pipe in the building. A circumferential channel being formed on a conduit comprising a portion of the valve to receive a plurality of fasteners thereon for attaching the valve body to the conduit. Further, a tension relief bar having a pair of apertures is utilized to manually control the movement of a valve member relative to a valve seat within the valve body. One of the apertures being positioned for receiving a locking pin therein to hold the valve member apart from the valve seat. The capability to rotate and separate the valve body from the conduit allows for flexibility in servicing and connecting the valve body to the conduit.

22 Claims, 9 Drawing Sheets

MECHANICAL PRESSURE RELIEF VALVE HAVING A VARIABLE POSITION OUTLET

REFERENCE TO RELATED APPLICATIONS

This application is a continuation-in-part of U.S. patent application Ser. No. 08/288,814, filed on Aug. 11, 1994 now U.S. Pat. No. 5,577,389 and entitled RUPTURE DISK FRAGMENT COLLECTION TRAP FOR REFRIGERATION SYSTEMS.

BACKGROUND OF THE INVENTION

The present invention relates generally to the field of pressure relief units for mechanical refrigeration systems, and more particularly to a mechanical re-seating type valve which is rotatable to align an outlet aperture therein with a vent pipe. Although the invention was developed for use in pressure relief units for mechanical refrigeration systems certain applications may be outside this field.

A low pressure centrifugal chiller vessel is generally utilized in commercial and industrial refrigeration systems, such as for providing air conditioning in hotels, cooling fluid for a manufacturing process, and commercial food refrigeration systems. A low pressure centrifugal chiller vessel generally operates under a vacuum of about sixteen inches of mercury, and should not operate at a pressure exceeding fifteen pounds per square inch above atmospheric pressure. Inherent to commercial and industrial refrigeration systems is an expectation that there will be a minimal amount of down time. Typically, these refrigeration systems are operated until a system breakdown occurs. At that time repair service is initiated to put the system back into operation. The down time that results from this kind of reactive maintenance program is, at best, an inconvenience for the system user. It often can have very costly consequences, such as food spoilage in commercial food refrigeration systems.

A mechanical refrigeration system including a low pressure centrifugal chiller vessel generally utilizes a chlorinated fluorocarbon (CFC) refrigerant. CFC refrigerants, many of which are sold by Dupont under the well known tradename FREON, have various boiling points, depending on the particular type of CFC refrigerant. Some typical types of CFC refrigerants are, for example R-11, R-113, and R-123. Freon and its related family of compounds are well known and widely used as heat transfer media in mechanical refrigeration systems.

Refrigeration systems generally include the pressurized storage of a vaporized refrigerant. To comply with applicable safety codes these systems have a pressure relief system for venting an over-pressurized storage vessel. For many years, it was the practice in the industry to design the pressure relief system to vent the CFC refrigerant from the over-pressurized storage vessel directly into the atmosphere. Recently, however, because of concerns for the environment and possible destruction of the ozone layer above the earth, it has become desirable, and in many cases mandated by law to minimize the release of CFC refrigerants into the atmosphere.

Environmental concerns, though significant, are not the only factor in favor of preventing the release of CFC refrigerant into the atmosphere. In recent years the cost of CFC refrigerants has escalated drastically, having increased over ten fold for some refrigerants in the past few years, while the available supply of CFC refrigerants is dwindling. For these reasons it is desirable to insure that no significant amount of CFC refrigerant is vented into the atmosphere through the pressure relief system.

In the design of pressure relief units for mechanical refrigeration systems it has become an industry practice to provide a mechanical re-seating type valve. The mechanical re-seating type valves have generally been connected by a threaded adapter to the pressure vessel or a fluid pathway which is connected to the pressure vessel. With reference to FIG. 1, there is illustrated a typical prior art adapter (a) which connects the mechanical re-seating type valve (b) to the pressure vessel (c). The adapter (a) being externally threaded on both ends (d) and (e) and the pressure vessel (c) and the valve body (b) being correspondingly threaded to receive the ends (d) and (e) respectively. In order to obtain a fluid tight seal between the valve body (b) and the adapter (a) it is necessary that the valve body (b) engages the upper surface (f) of the adapter (a). The metal to metal contact between the upper surface of the adapter (a) and the valve body (b) creates the fluid tight seal.

The prior method of connecting the valve body (b) to the pressure vessel (c) limits the service technicians ability to adjust the orientation of the valve body outlet (k) with respect to a vent pipe (not illustrated) existing in the building. If the service technician desires to reorient the valve body so as to align the outlet (k) with the vent pipe, the technician must loosen the connection between the valve body (b) and the adapter (a), thereby degrading the fluid tight seal between the valve body (b) and the adapter (a).

The mechanical re-seating type valve is placed in series with and down stream from a fragmentary carbon rupture disk. The fragmentary carbon rupture disk is calibrated to burst into pieces at a predetermined maximum pressure. At any pressure up to the maximum pressure the carbon rupture disk provides an excellent positive seal to prevent the venting of CFC refrigerant into the atmosphere, and the infiltration of any contaminants into the refrigeration system. A combination of the fragmentary carbon rupture disk end the mechanical re-seating relief type valve, provides the positive seal characteristics of the carbon rupture disk and the re-seating capability of the mechanical relief valve.

A common limitation of refrigeration systems, having a mechanical re-seating relief valve downstream from a fragmentary carbon rupture disk is that the fragments from the burst carbon rupture disk often lodge in the seat of the relief valve. Naturally any debris or fragments of significant size that lodge in the seat will interfere with the re-seating of the mechanical relief valve after the refrigerant pressure has dropped below a predetermined threshold. Absent the positive seal provided by the mechanical re-seating relief valve, the CFC refrigerant is vented into the atmosphere.

Many designers of refrigeration systems have attempted to overcome this common limitation by utilizing a non-fragmentary metal rupture disk in place of the fragmentary carbon disk. The use of the non-fragmentary metal rupture disk has been shown to eliminate fragments from the burst rupture disk interfering with the re-seating of the mechanical relief valve. However, the metal rupture disk leaves unsolved a litany of other problems and creates a particularly undesirable consequence of its own. One problem the metal rupture disk leaves unsolved pertains to the interference with the re-seating of the mechanical relief valve by other contaminates occurring in the refrigeration system.

A consequence of retrofitting an existing carbon-disk refrigeration system with a non-fragmentary metal rupture disk is that the refrigeration system and the associated chiller vessel must be evacuated. In order to perform this task it is necessary to shut down the commercial or industrial operation utilizing the cooling capacity from the refrigeration system to capture the charge of the CFC refrigerant. This charge of CFC refrigerant can be from 200 lbs. to 2,500 lbs., or more. The evacuation of CFC refrigerant from the system is a very time consuming and costly procedure to perform. In addition, many commercial and industrial refrigeration systems are in constant demand and have no scheduled down time, therefore, the shutting down of the system decreases the production time of the associated commercial or industrial operation. Further, prior designers of pressure relief units have generally relied upon the service technician to align the vent pipe with the valve body outlet by rerouting the vent pipe, rather than reorienting the valve body to align the valve outlet with the existing vent pipe.

Even with a variety of earlier designs there remains a need for an improved mechanical re-seating type valve. The present invention satisfies this need in a novel and unobvious way.

SUMMARY OF THE INVENTION

To address the unmet needs of prior pressure relief units for mechanical refrigeration systems, the present invention contemplates an apparatus comprising: a mechanical refrigeration system; a rupture disk connected to the mechanical refrigeration system; and a pressure relief system connected to the rupture disk, comprising: a valve body, the valve body having an inlet and an outlet; a conduit being positioned within the inlet; a first fluid tight seal between the inlet and the conduit for preventing the leakage of fluid therebetween; the valve body rotatable relative to the conduit without substantially diminishing the first fluid tight seal between the inlet and the conduit; a circumferential locking channel on one of the inlet and the conduit; and at least one fastener engageable between the circumferential locking channel and the other of the inlet and the conduit for preventing movement between the valve body and the conduit.

Another form of the present invention contemplates a method for accessing the valve and valve seat within a mechanical pressure relief system having a tension relief bar, a valve body, a valve, a valve seat, and a conduit. The method comprises: moving the tension relief bar outwardly from the valve body to displace the valve from the valve seat; inserting a holding bar into the tension relief bar for maintaining the tension relief bar extended outwardly from the valve body; loosening the fasteners that hold the valve body and the conduit together; and lifting the valve body from the conduit.

One object of the present invention is to provide an improved mechanical relief valve for use with a mechanical refrigeration system.

Related objects and advantages of the present invention will be apparent from the following description.

DESCRIPTION OF THE PREFERRED EMBODIMENT

Figure 1:
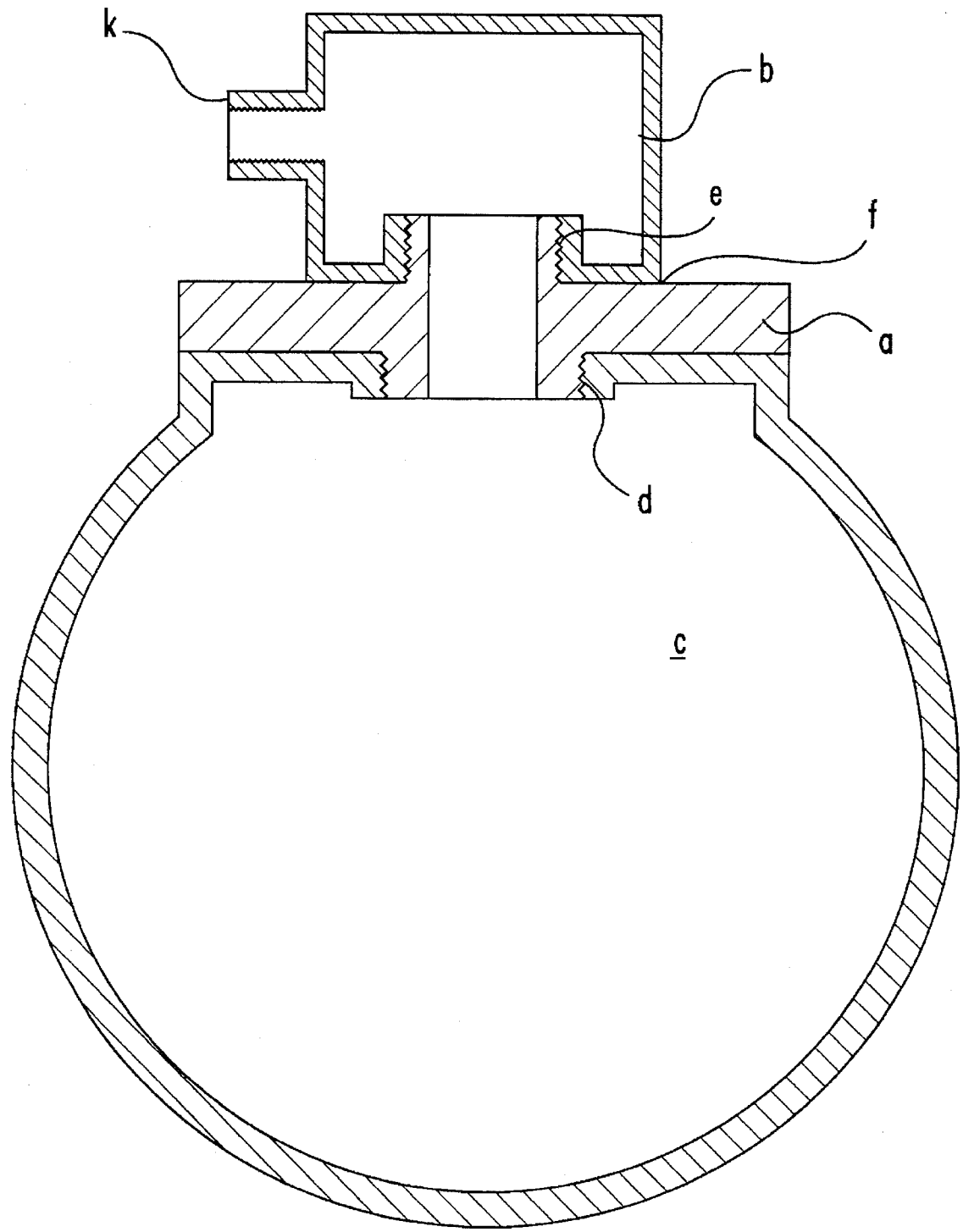
FIG. 1 is a side elevation view of a prior method of attaching a mechanical pressure relief type valve to a vessel.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
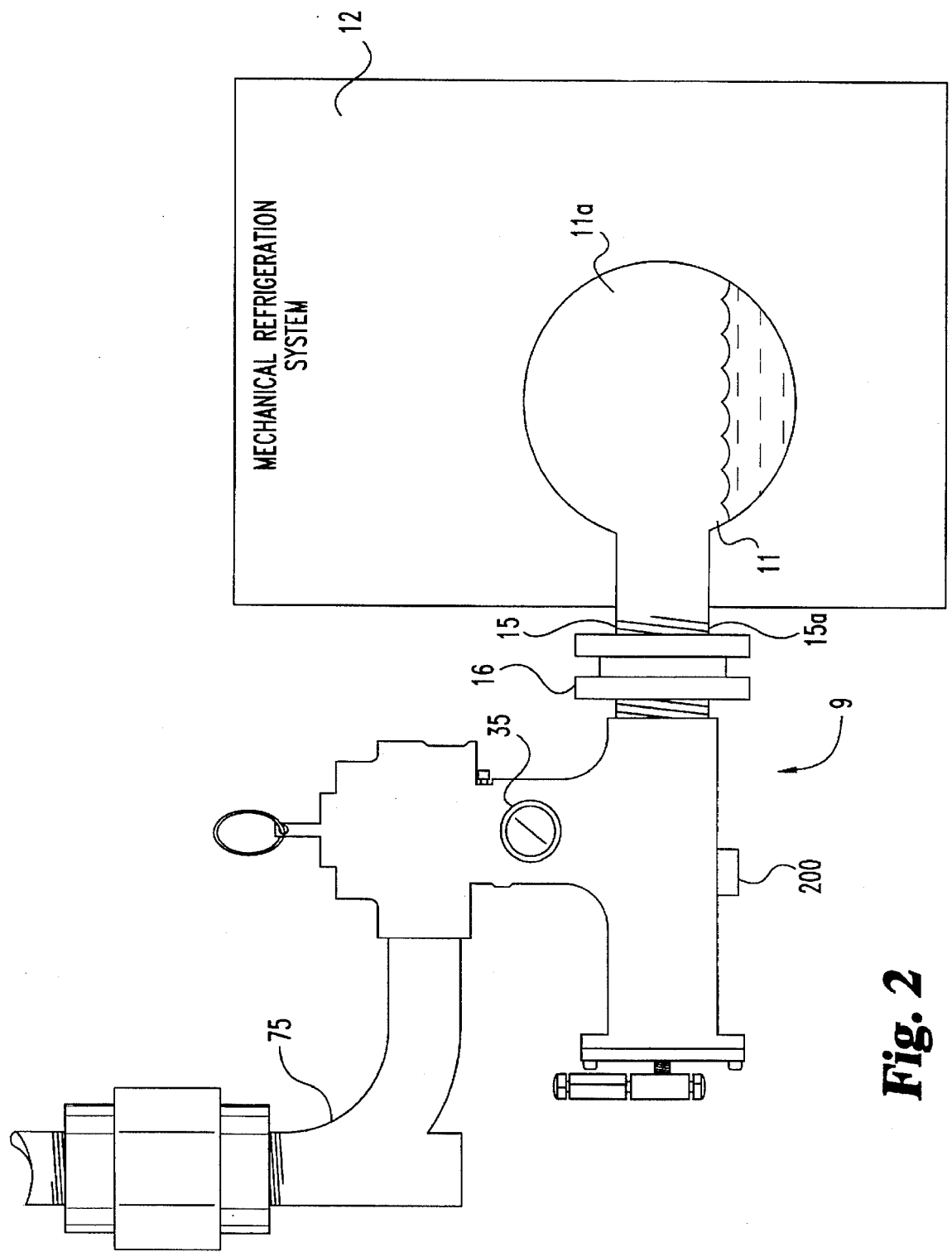
FIG. 2 is an illustrative side elevational view of the mechanical refrigeration pressure relief system with a fragment collection trap according to one embodiment of the present invention.
Figure 3:
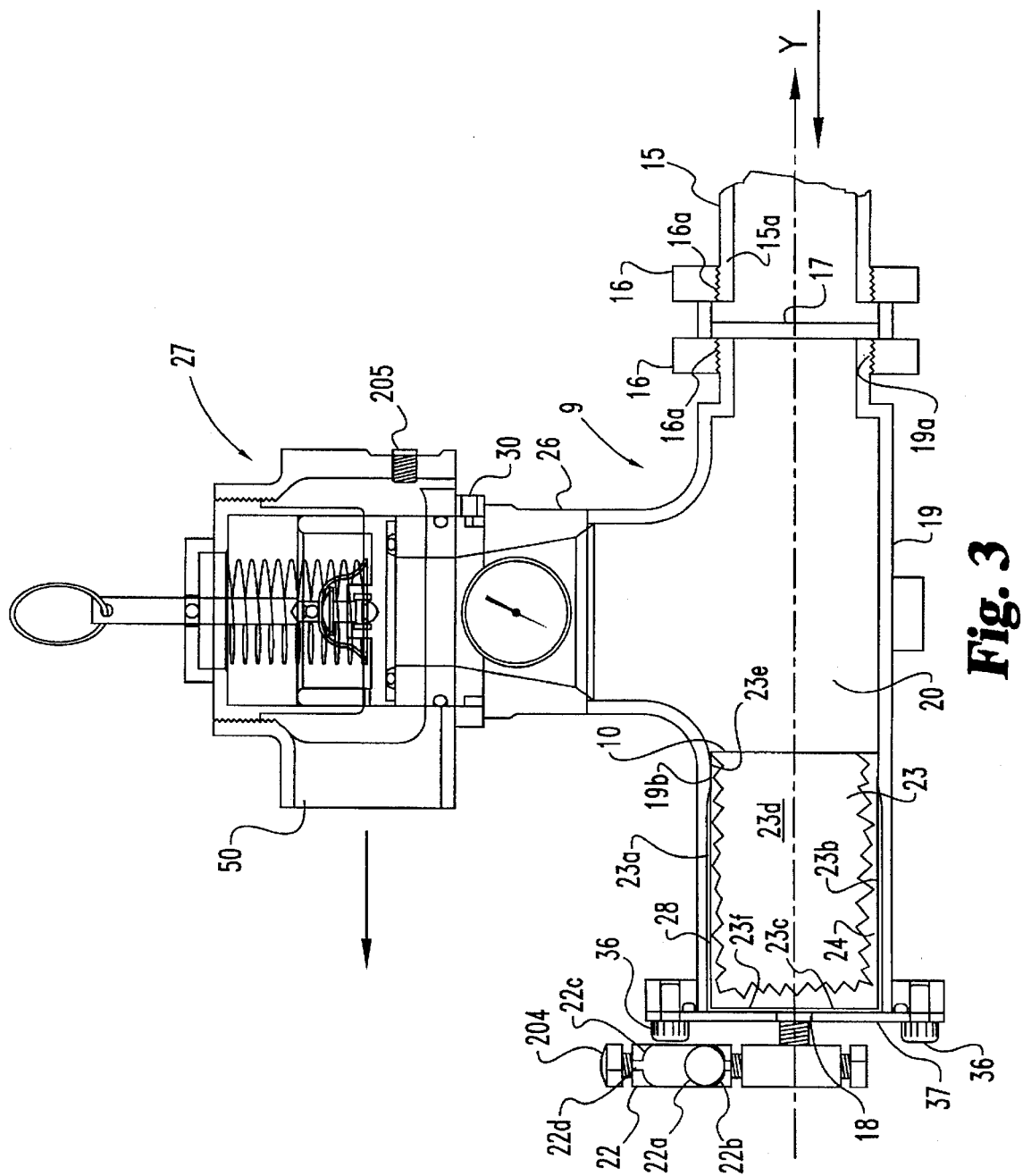
FIG. 3 is an illustrative side elevational view of the FIG. 2, mechanical refrigeration pressure relief system with a fragment collection trap.
Figure 4:
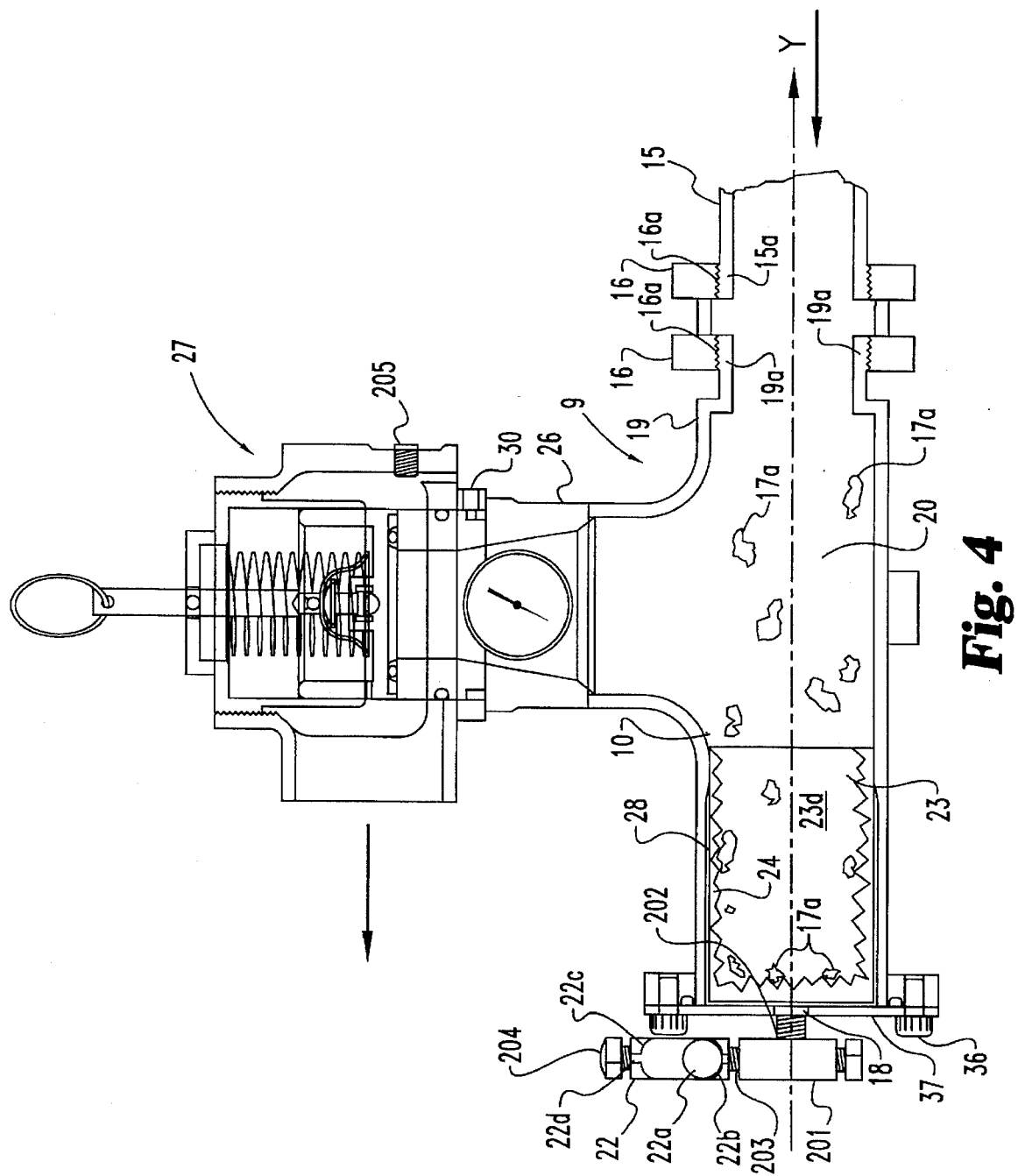
FIG. 4 is an illustrative side elevational view of the FIG. 2, mechanical refrigeration pressure relief system with a fragment collection trap, after the rupture disk has burst.

With reference to FIGS. 2–4, there is illustrated a mechanical refrigeration pressure relief system 9 having a rupture disk fragment collection trap 10 therein. The pressure relief system 9 is connected to a low pressure chiller vessel 11, which forms a part of a mechanical refrigeration system 12. Chiller vessel 11 is designed and manufactured to contain liquid CFC refrigerant, and vaporized CFC refrigerant. The following United States Patents which relate generally to refrigeration systems are herein incorporated by reference; U.S. Pat. No. 5,241,837, U.S. Pat. No. 4,267,705, U.S. Pat. No. 3,276,216, and U.S. Pat. No. 3,131,548.

In the previously incorporated U.S. patents the components of a typical refrigeration system are illustrated, into which can be incorporated the pressure relief system 9 with fragment collection trap 10. It should be noted that mechanical refrigeration systems are generally well known to a person skilled in the art. A low pressure centrifugal chiller vessel 11 is designed and constructed to operate normally under a vacuum of sixteen inches of mercury, and the pressure in the vessel should not exceed 15 pounds per square inch above atmospheric pressure. The interior volume 11a of the chiller vessel 11 being subject to a vacuum creates the potential, if a leak develops in a seal, for the infiltration of contaminates, such as air and moisture into the vessel 11. Infiltration of contaminants into the refrigeration system 12 generally causes an increase in condensing pressure and compressor power requirement, while effectively reducing the chillers efficiency and cooling capacity.

The pressure relief system 9 is connected to the chiller vessel 11 through a refrigeration connection conduit 15. In the preferred embodiment the refrigeration connection conduit 15 is fabricated from a corrosion resisting stainless steel pipe. Alternate materials are contemplated which also preclude the formation of corrosion and scale, such as nickel or chromium plated pipes. The refrigeration connection conduit 15 is substantially cylindrical, and has an externally threaded end 15a. Further, the refrigeration connection conduit 15 must be structurally strong to support the aggregate weight of the pressure relief system that is cantilever mounted thereto. An integral support mounting coupling 200 is formed on the pressure relief system 9 for providing a connection point for an external support (not illustrated). In the preferred embodiment the pressure relief system 9 is mounted in a horizontal orientation.

In the preferred embodiment an intermediary coupling member 16 having an internally threaded surface 16a is utilized to connect the refrigeration connection conduit 15 with the pressure relief system 9. The internally threaded surface 16a corresponds to the external threads formed on conduit 15a. Coupling member 16 supports a fragmentary carbon rupture disk 17 that extends across the conduit 15 for blocking the flow of refrigerant into the pressure relief system 9. Pressure relief system 9 and the refrigeration connection conduit 15 are designed and constructed to be in a sealed fluid communication with the chiller vessel 11 when the carbon rupture disk 17 burst.

Fragmentary carbon rupture disks 17 are well known in the industry for providing a fluid tight seal, and for protecting against over-pressurization of a chiller vessel 11. The sizing of the fragmentary carbon rupture disk 17 is determined based on a plurality of parameters, which include: the maximum operating pressure of the chiller vessel 11; the volumetric flow rate required for relieving the over-pressurized state of chiller vessel 11; the diameter of the passageway; and the material properties of the disk. In the preferred embodiment the carbon rupture disk is two inches in diameter and has a material thickness of forty thousandths (0.040) of an inch in order to meet the physical requirements of the system. In one alternate form of the present invention a carbon rupture disk of three inches in diameter with a material thickness of forty thousandths (0.040) of an inch is utilized. It is further understood that carbon rupture disks having other diameters and thicknesses are contemplated. The carbon rupture disk of the preferred embodiment is designed to burst at a pressure of 15 pounds per square inch above atmospheric pressure to allow the chiller vessel 11 to vent.

With reference to FIG. 4, there is illustrated the pressure relief system 9 in which a sudden pressure surge in the chiller vessel 11 caused the fragmentary carbon disk 17 to rupture into fragments 17a, thereby allowing the CFC refrigerant to escape into the passageway of pressure relief system 9. The pressure in the chiller vessel 11 decreases dramatically as a portion of the CFC refrigerant escapes into the pressure relief system 9 and ultimately a portion of the refrigerant is vented into the atmosphere. A gauge 35 is connected to the pressure relief system 9 for indicating the refrigerant pressure within pressure relief system 9. The gauge 35 is for alerting an attendant that the pressure relief system 9 has had an increase in pressure, thereby indicating that the rupture disk 17 burst.

In the preferred embodiment, a double check pressure equalizing valve 22 is incorporated into the pressure relief system 9 for venting refrigerant into the atmosphere from small leaks in the fragmentary carbon rupture disk 17. The double check valve 22 is designed for preventing the accumulation of refrigerant from a small leak in the pressure relief system 9. The double check valve 22 is designed and constructed to vent the refrigerant into the atmosphere, after a predetermined pressure has developed within the pressure relief system 9 thereby displacing a seating ball 22a from a ball seat 22b. An aperture 18 is formed in a housing 19 for connecting the internal volume 20 of housing 19 with the double check valve 22. An elbow 201 having an externally threaded fastener 202 is received within the internally threaded aperture 18, and an externally threaded pipe 203 connects the elbow with the double check valve 22. In an alternative embodiment an outlet 204 of the double check pressure equalizing valve 22 is connected to an opening 205 in the valve 27. This arrangement prevents the seepage of CFC Refrigerant into the equipment room.

In the preferred embodiment the housing 19 is fabricated from a corrosion resisting stainless steel pipe or tube. Alternate materials are contemplated which precludes the formation of corrosion and scale, such as nickel or chromium plated pipes. The housing 19 is substantially cylindrical, and has an externally threaded end 19a. Externally threaded end 19a engages with the internally threaded surface 16a of coupling member 16 to connect the pressure relief system 9 through conduit 15 to chiller vessel 11. A plurality of threaded fasteners 36 hold a removable end plate 37 in contact with housing 19. Removable end plate 37 provides access to the internal volume 20 of housing 19 for inspecting, positioning, installing, and removing container 23.

In the event of over-pressurization of the chiller vessel 11, the fragmentary carbon rupture disk 17 will burst, thereby allowing a flow of refrigerant into the housing 19. Upon carbon rupture disk 17 bursting the pressure in housing 19 is elevated to a sufficient level to drive the seating ball 22a of check vale 22 into a sealing arrangement with an upper seat 22c, thereby closing aperture 22d. With aperture 22d sealed by seating ball 22a the refrigerant is unable to escape into the atmosphere, through check valve 22 and is now contained within pressure relief assembly 9.

The trap 10 comprises a generally cylindrical container 23, disposed within the interior volume 20 of housing 19 adjacent removeable end plate 37. The cylindrical container 23 has an external cylindrical surface 23a that contacts a corresponding internal cylindrical surface 19b of housing 19. A portion of the cylindrical container 23 is spaced apart a radial distance 28 from the internal cylindrical surface 19b to allow for the relaxation of assembly tolerances, provide for the ease of installation of the container within the housing 19, and to allow pressurized refrigerant to flow around the container to the double check valve 22. Container 23 has a cylindrical wall member 23b and a base wall member 23c that define an interior volume 23d. The cylindrical wall member 23b and base wall member 23c have corresponding interior surfaces 23e and 23f that are coated with a layer of tack compound 24 of approximately ⅛" in thickness.

The tack compound 24 generally is a non-rigid sticky substance having suitable holding capacity to retain the fragments 17a, from a burst carbon rupture disk 17, that flow into the trap 10. In the preferred embodiment the tack compound 24 defines a very high viscosity grease, however, it is understood that there are other materials having suitable characteristics to retain the fragments 17a within the interior volume 23d of the trap 10. Further, the trap 10 captures other contaminants being transported by the escaping refrigerant into the interior volume 23d of the trap 10.

In the preferred embodiment the housing 19 is fabricated from stainless steel pipe, having a two inch diameter and a ⅛ inch wall thickness, welded together to form the required geometric shape. In one alternate form of the present invention a three (3) inch carbon rupture disk is utilized and placed within a system having a four inch diameter housing that is fabricated from a stainless steel pipe. An alternate embodiment contemplates casting the housing 19 as a single piece.

A conduit 26 is disposed transverse to a central axis Y of housing 19 for attaching a mechanical re-seating type of valve 27 to the housing. The conduit 26 functions to support the re-seating type of valve 27 on housing 19, and to connect the re-seating type of valve 27 in fluid communication with the chiller vessel 11. In the preferred embodiment the conduit 26 is substantially cylindrical and fabricated from a corrosion resisting stainless steel pipe or tube. As previously discussed the conduit could alternately be integrally cast with housing 19. Alternate materials are contemplated which also preclude the formation of corrosion and scale such as nickel or chromium plated pipes. A plurality of externally threaded fasteners 30 are utilized to fasten the re-seating valve to conduit 26.

Figure 7:
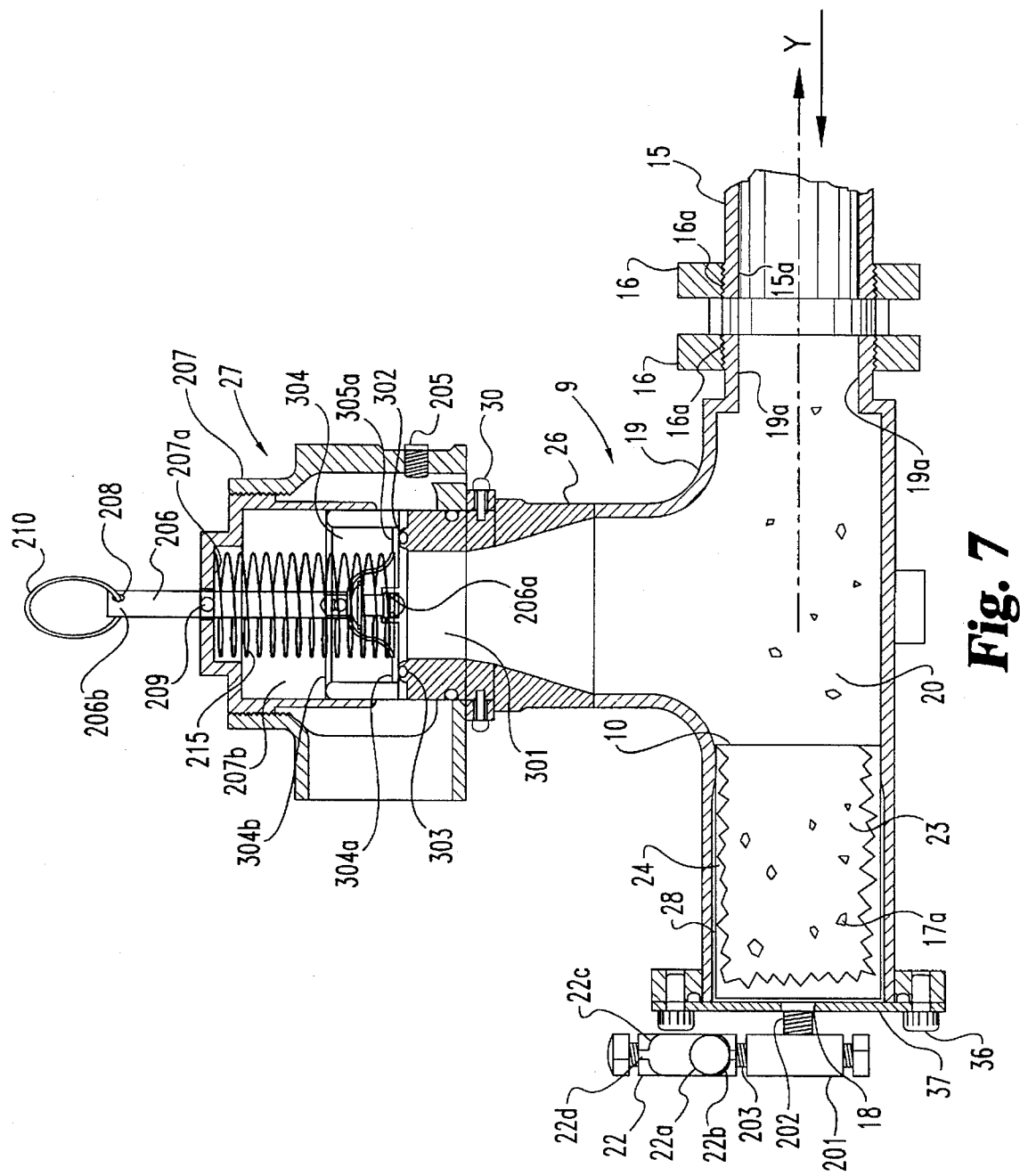
FIG. 7 is an illustrative side elevational view of the mechanical pressure relief type valve in a normally closed position according to one embodiment of the present invention.
Figure 8:
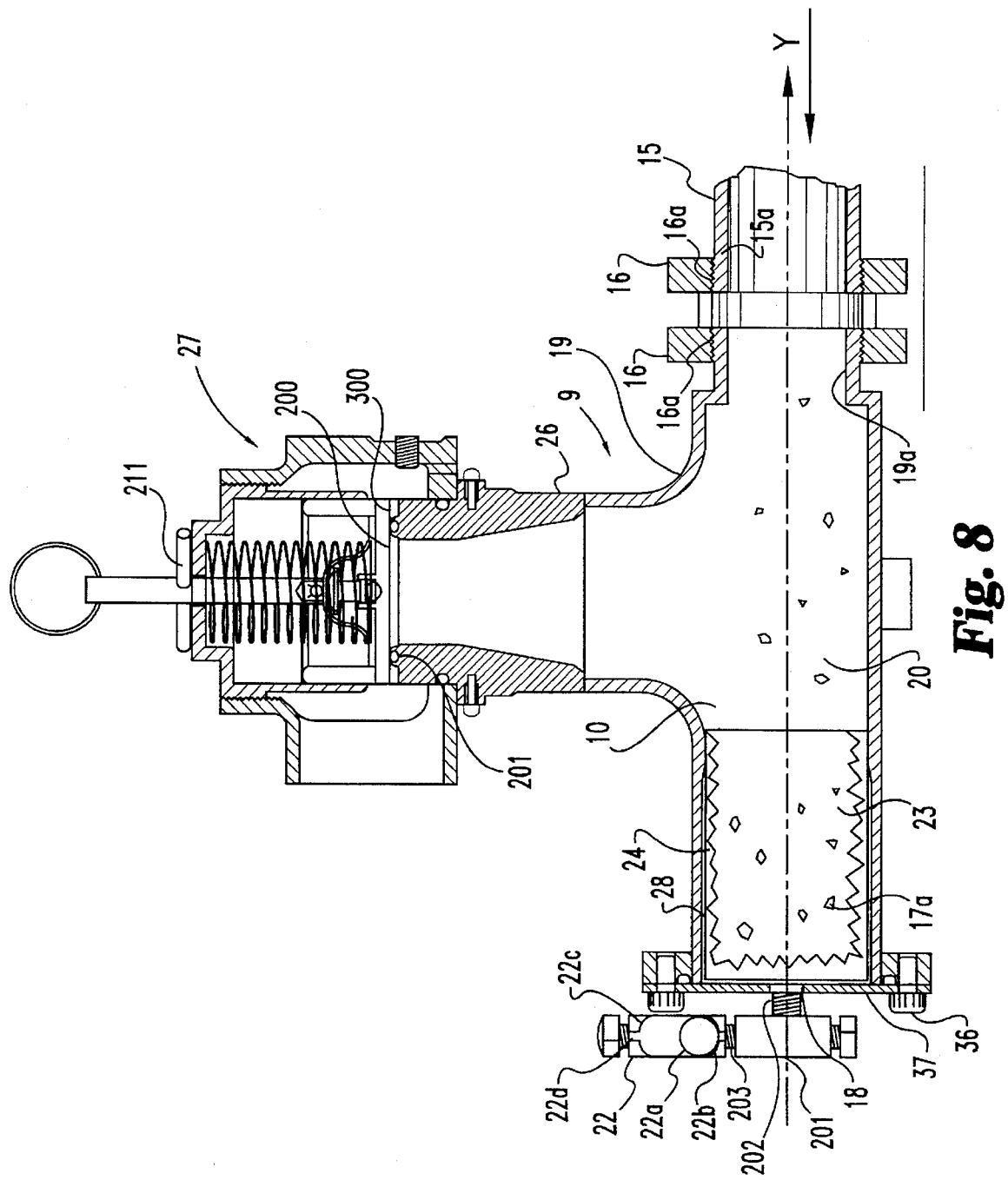
FIG. 8 is an illustrative side elevational view of the mechanical pressure relief type valve in an opened position according to one embodiment of the present invention.
Figure 9:
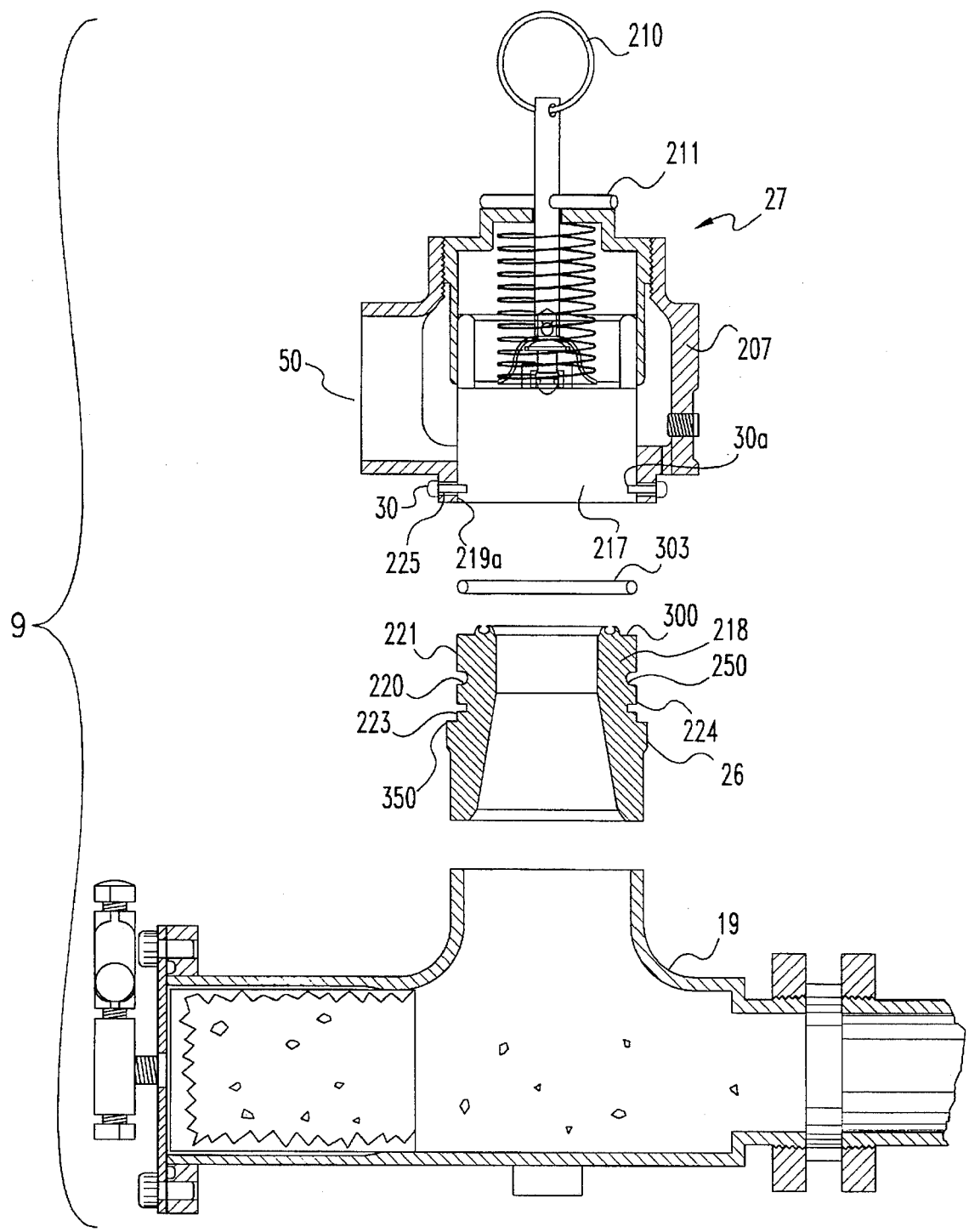
FIG. 9 is a partially exploded view of the FIG. 7 pressure relief type valve according to one embodiment of the present invention.

With reference to FIGS. 7–9, there is illustrated the mechanical re-seating type valve 27 connected to the pressure relief system 9. In other forms of the present invention it is contemplated that the mechanical re-seating type valve 27 is connected to other passageways which allow the flow of fluid therethrough. In the preferred embodiment the pressure differential across the valve is between the fluid passageway 301 and the valve body chamber 207b. The conduit 26 has an annular upper surface 300 that is formed around the fluid passageway 301. A circular channel 302 is formed on the upper surface 300 around the fluid passageway for receiving a sealing o-ring 303 therein. In the preferred embodiment the o-ring 303 comprises the valve member seat, however other valve member seats are contemplated. The o-ring 303 being positioned within the channel 302 such that it is contactable by a valve member 304. In alternate embodiments of the present invention other sealing means are contemplated than an o-ring 303. The valve member 304 being substantially cylindrical with an annular disk wall member 304a and a cylindrical wall member 304b. Valve member 304 being moveable between a normally closed position where the annular disk wall member 304a abuts o-ring 303, and an open position, which allows fluid flow through valve 27, where disk wall member 304a is spaced apart from the o-ring 303. In the normally closed position a fluid tight seal is created between the annular disk wall member 304a and the o-ring 303 to prevent the flow of fluid through the mechanical re-seating type valve 27. In the preferred embodiment the annular disk wall member 304a is connected to a first end 206a of a valve stem 206, and the opposite other end 206b of valve stem 206 extends outside of the valve body 207.

The valve stem 206 includes 8 pair of axially spaced apertures 208 and 209 formed proximate the second end 206b. A pull ring 210 being connected to the first aperture 208. The pull ring 210 being designed to receive the fingers from a service technician, who grasps with his fingers and transmit a pulling force to the valve stem 206 which in turn displaces the valve member 304 from the o-ring 303. The second aperture 209 is designed and construed for receiving a locking pin 211 therein. When the re-seating type valve 27 requires service, to be mounted, or moved with respect to conduit 26 it is preferred that the pull ring 210 be grasped and utilized to withdraw the valve stem 206 outwardly from valve body 207, which in turn draws the valve member 304 from the o-ring 303. After the service technician has sufficiently withdrawn the valve stem 206 from the valve body 207 he can insert the locking pip 211 into aperture 209, thereby locking the valve stem 206 in a spaced relationship from o-ring 303. In the preferred embodiment the locking pin 211 is a substantially cylindrical solid steel pin. The use of the interengaging o-ring 303 and annular disk wall member 304a sealing arrangement allows for the convenient servicing of valve 27 in the field.

A coil spring 215 is positioned around valve stem 206 between an inner surface 207a of valve body 207 and a surface 305a of the valve member 304. Coil spring 215 provides the force to normally hold the annular type disk wall member 304a of valve member 304 against the o-ring 303. The mechanical re-seating valve 27 is calibrated at the factory to ensure consistent and accurate opening and closing of the valve 304.

With reference to FIG. 9, there is illustrated a partially exploded view of the mechanical pressure relief system 9. The conduit 26 is preferably a separate component that is welded to the housing 19, however in an alternate form of the present invention the conduit 26 is integrally cast with the housing 19. The outside diameter surface 218 of conduit 26 is slightly smaller than the mating inside diameter surface 219a of the inlet aperture 219 formed in valve body 207. The relative difference in diameter size produces a substantially tight sliding fit between the respective parts.

A stop 350 is formed on conduit 26 to limit the penetration of the conduit 26 into the valve body 207. In the preferred embodiment, the circumferential stop 350 defines an annular shoulder having an outside diameter larger than the inside diameter surface 219a of the inlet aperture 219, thereby limiting the insertion of the conduit 26 within the inlet aperture 219. In alternate embodiments other stops are contemplated which limit the penetration of the conduit 26 relative to the valve body 207. In the preferred embodiment a first circumferential channel 220 for receiving a second o-ring 250 is formed on the substantially cylindrical outer surface 221 of conduit 26. The second o-ring 220 is positioned between the walls of the first circumferential channel 220 and contacts a portion of the inside diameter surface 219a of inlet aperture 219 to create a substantially fluid tight seal when the valve body 207 is connected with the conduit 26. The valve body 207 being rotatable relative to the conduit 26 without substantially diminishing the substantially fluid tight seal between the inlet of the valve body 207 and the conduit 26.

Spaced axially from the first circumferential channel 220 on conduit 26 is a locking circumferential channel 223. The locking circumferential channel 223 is designed to receive the end 30a of fasteners 30 therein. A circumferential chamfer 224 is formed on conduit 26 adjacent the substantially cylindrical outer wall surface 221 and connects to the locking circumferential channel 223. The chamfer 224 provides a leadin for guiding the end 30a of fasteners 30 into the locking circumferential channel 223. In the preferred embodiment three fasteners 30 pass through threaded apertures 225 formed in the valve body 207; the apertures being spaced 120° apart. One advantage of the present invention is that the valve body 207 can be rotated on the conduit 26 to align the outlet aperture 50 with vent pipe 75. After the desired alignment between outlet aperture 50 and the vent pipe 75 is obtained the fasteners 30 are tightened so that end 30a engages the locking circumferential channel 223 and prevent the relative movement between the valve body 207 and the conduit 26.

In the preferred embodiment the design and construction of the pressure relief system 9 enables the mechanical re-seating type valve 27 to be serviced in the field, thereby minimizing the time delay and exposure related to sending the valve 27 to a factory service center. A common item to service in the valve 27 is the o-rings 303 and 250. In order to service the o-rings 303 and 250 the service technician pulls the pull ring 210 outwardly from the valve body 207 thereby displacing the annular disk wall member 305a from the o-ring 303. After moving the valve stem 206 sufficiently to completely expose the second aperture 209, and displace the valve member 304 from the valve member seat, the locking pin 211 is inserted into the second aperture 209. The plurality of fasteners 30 are loosened sufficiently to remove end 30a from the locking circumferential channel 223. With the ends 30a of fasteners 30 removed from channel 223, the service technician can lift the valve body 207 from the conduit 26. The installation of the pressure relief type valve 27 onto conduit 26 is the inverse of the procedure for mounting the valve 27 onto conduit 26. More particularly, the service technician will rotate the valve body 207 to align the outlet aperture 50 of the valve 27 with the vent pipe 75 before connecting the valve 27 to conduit 26.

With reference to FIG. 4, an example is provided illustrating how fragment collection trap 10 prevents fragments 17a from the burst carbon rupture disk 17 from interfering with the re-seating of pressure relief valve 27. Upon over-pressurization of chiller vessel 11, the force produced therein by the pressurized refrigerant is sufficient to rupture the fragmentary carbon rupture disk 17. The discharge of the pressurized refrigerant into the housing 19 has sufficient force to carry the fragments 17a past the flange 26 and into the container 23 that is disposed adjacent the end plate 37. The momentum of fragments 17a carry them into the internal volume 23d of the cylindrical container 23, where they engage the tack compound 24. With the fragment collection trap 10 having contained the fragments 17a, the mechanical valve 27 is able to re-seat when the pressure drops below a predetermined threshold.

Figure 5:
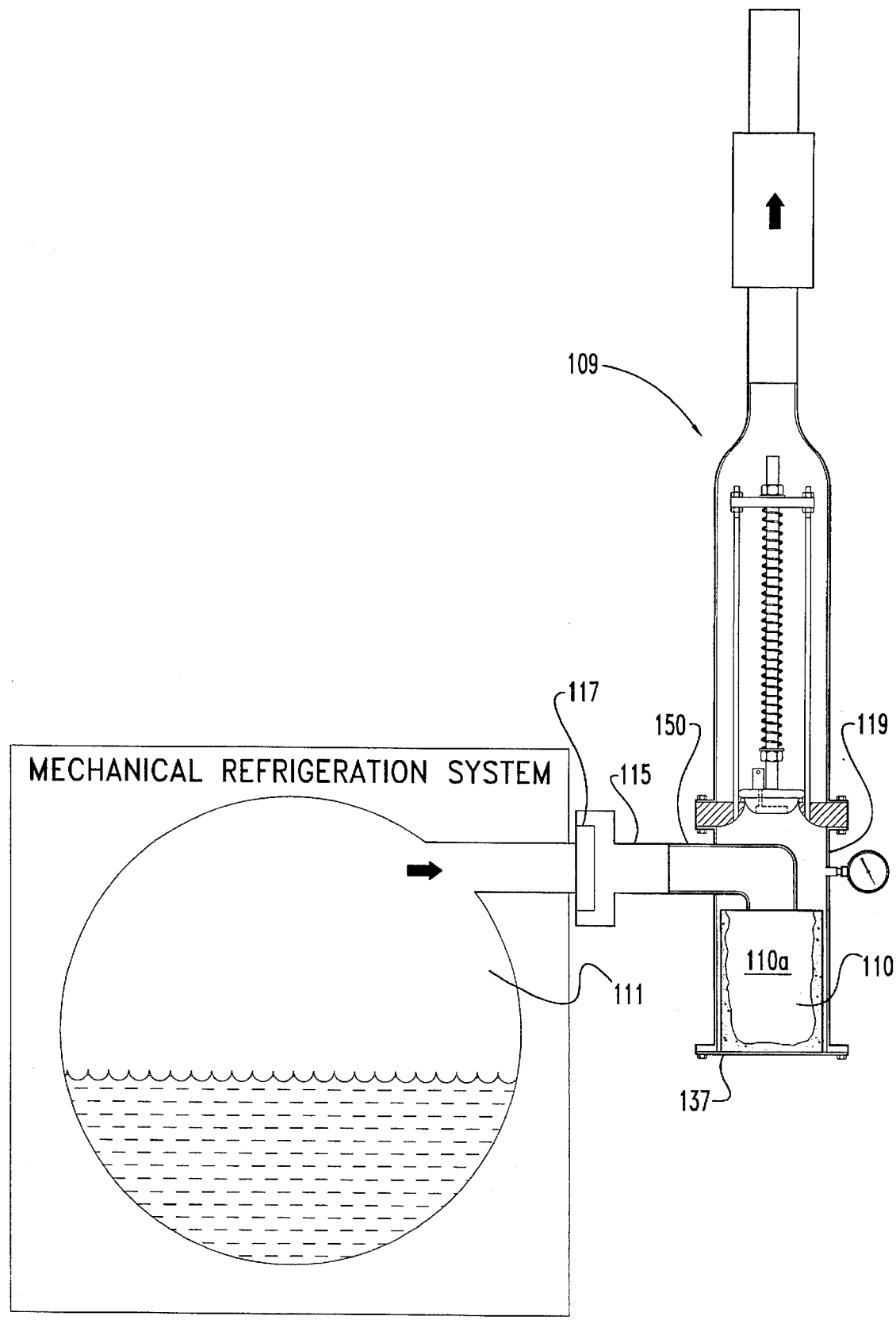
FIG. 5 is an illustrative side elevational view of the mechanical refrigeration pressure relief system with a fragment collection trap according to another embodiment of the present invention.
Figure 6:
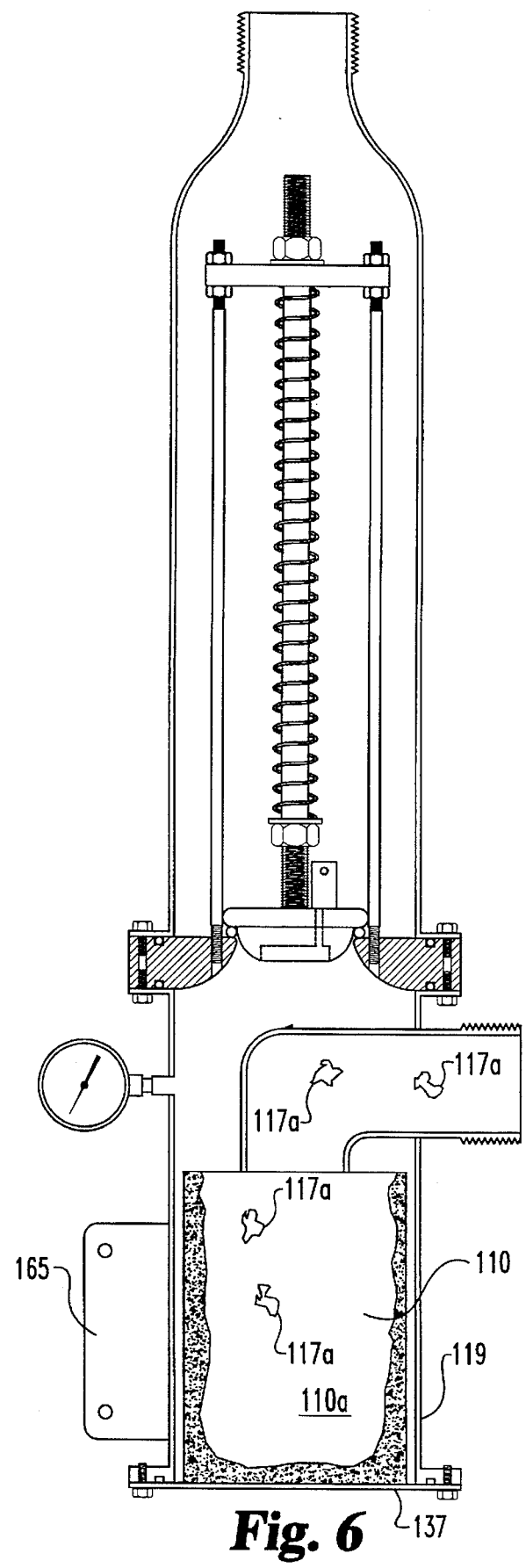
FIG. 6 is an enlarged illustrative side elevational view of the FIG. 5, mechanical refrigeration pressure relief system with a fragment collection trap having the refrigeration unit removed.

One alternative of the present invention is illustrated in FIGS. 5 and 6, wherein the pressure relief system 109 is oriented transversely to a conduit 115 that connects a chiller vessel 111 with the pressure relief system 109. The general construction and function of the corresponding pressure relief system 109 is virtually the same as the pressure relief system 9 in most respects. An elbow 150 is positioned relative to housing 119 to direct the refrigerant and fragments 117a existing a chiller vessel 111 through a burst carbon rupture disk 117 into trap 110.

In the alternative form of the present invention, trap 110 is disposed adjacent a removable end plate 137 of housing 119. The trap 110 is positioned within the housing 119 for capturing the fragments 117a and any other contaminates that are transported into the interior volume 110a of the trap. Further, a mounting bracket 165 is provided to support the pressure relief system 109 relative to chiller vessel 111.

The following steps highlight a retrofit installation of the pressure relief system 9 into an existing operation. The first step is to determine the mounting arrangement for the pressure relief system 9 in relation to the rupture disk vent pipe 75 and the chiller vessel 11. After ascertaining the desired mounting location, it is necessary to remove a quantity of vent pipe 75 in order to install the pressure relief system 9. Connect the threaded end 19a of housing 19 to the internally threaded surface 16a of coupling member 16. After connecting housing 19 to the chiller vessel 11 insure that the pressure relief system 9 is oriented in a substantially horizontal mode. It is now necessary to connect the vent piping from the atmosphere to the discharge opening 50 of valve 27. As previously discussed the design of the mechanical relief type valve allows for the rotation of the valve body 207 relative to the conduit 26 to permit the ready alignment of the outlet aperture 50 with the vent pipe 75. Another step involves removing the end plate 37 from housing 19 and sliding the container 23 axially within the housing 19. After positioning the container 23 within housing 19, refasten the end plate 37 with fasteners 36 to housing 19 to obtain a positive seal.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed:

1. In combination:
   a mechanical refrigeration system;
   a rupture disk connected to the mechanical refrigeration system; and
   a pressure relief system connected to said rupture disk, comprising:
   a valve body, said valve body having an inlet and an outlet;
   a conduit being positioned within said inlet;
   a first fluid tight seal between said inlet and said conduit for preventing the leakage of fluid therebetween;
   said valve body rotatable relative said conduit without substantially diminishing the first fluid tight seal between said inlet and said conduit;
   a circumferential locking channel on one of said inlet and said conduit; and
   at least one fastener engageable between said circumferential locking channel and the other of said inlet and said conduit for preventing movement between said valve body and said conduit.

2. The combination of claim 1, wherein said conduit defining a pathway for the flow of fluid.

3. The combination of claim 2, wherein said inlet and said conduit being engageable to form a substantially tight sliding fit.

4. The combination of claim 3, wherein said first fluid tight seal further includes a first o-ring disposed between said inlet and said conduit.

5. The combination of claim 4, wherein one of said inlet and said conduit further includes a circumferential channel, said circumferential channel for receiving said first o-ring therein.

6. The combination of claim 5, which further includes:
   a valve seat located on one end of said conduit; and
   a valve member positioned within said valve body, said valve member engageable with said valve seat for controlling the flow of fluid through said valve body.

7. The combination of claim 6, wherein said valve member being normally disposed adjacent said valve seat to prevent the flow of fluid, said valve member being moveable relative said valve seat to allow the flow of fluids.

8. The combination of claim 7, wherein said valve seat includes an o-ring.

9. The combination of claim 8, which further includes a circumferential chamfer located adjacent said circumferential locking channel.

10. The combination of claim 9, wherein said fasteners being spaced 120 degrees apart around said locking channel.

11. The combination of claim 10, which further includes a valve stem that is connected to said valve member, said valve stem having a first and second aperture, at least one of said apertures being located external said valve body.

12. The combination of claim 11, which further includes a pull-ring connected to said valve stem, said pull ring being moveable to displace said valve member from said valve seat.

13. The combination of claim 12, which further includes a locking pin, said locking pin engageable with said second aperture of said valve stem for holding said valve member apart from said valve seat.

14. The combination of claim 13, wherein said circumferential locking channel being defined on said conduit.

15. The combination of claim 14, wherein said conduit further includes a stop for limiting the penetration of the conduit into said valve body.

16. The combination of claim 15, wherein said stop extending circumferentially around said conduit.

17. A pressure relief system comprising:
- at least one valve body, said at least one valve body having an inlet aperture and an outlet;
- a conduit, said conduit having a circumferential channel therearound, at least a portion of said conduit including said circumferential channel disposed within said valve body;
- a first seal positioned within said said inlet aperture and around said conduit for sealing between said valve body and said conduit;
- said at least one valve body rotatable relative said conduit without diminishing the sealing interface between said first seal and the wall of said inlet aperture; and
- at least one fastener engageable between said valve body and said circumferential channel for preventing movement between said valve body end said conduit.

18. The combination of claim 17, wherein said inlet and said conduit being engageable to form a substantially tight sliding fit.

19. The combination of claim 18, which further includes:
- a valve seat located on one end of said conduit; and
- a valve member positioned within said valve body, said valve member engageable with said valve seat for controlling the flow of fluid through said valve body.

20. The combination of claim 19, wherein said valve member being normally disposed adjacent said valve seat to prevent the flow of fluid, said valve member being moveable relative said valve seat to allow the flow of fluid.

21. The combination of claim 20, which further includes pull-ring connected to said valve stem, said pull ring being moveable to displace said valve member from said valve seat.

22. In combination:
- a mechanical refrigeration system; and
- a pressure relief system connected to said mechanical refrigeration system, comprising:
- a valve body, said valve body having an inlet and an outlet;
- a conduit, at least a portion of said conduit being positioned within said inlet;
- a first fluid tight seal between said inlet and said conduit for preventing the leakage of fluid therebetween;
- said valve body rotatable relative to said conduit without substantially diminishing the first fluid tight seal between said inlet and said conduit;
- a circumferential locking channel on one of said inlet and said conduit; and
- at least one fastener engageable between said circumferential locking channel and the other of said inlet and said conduit for preventing movement between said valve body and said conduit.

* * * * *

UNITED STATES PATENT AND TRADEMARK OFFICE
CERTIFICATE OF CORRECTION

PATENT NO. : 5,644,930
DATED : July 8, 1997
INVENTOR(S) : Luther D. Albertson et al.

It is certified that error appears in the above-identified patent and that said Letters Patent is hereby corrected as shown below:

In column 2, line 10, please insert a comma after "(e)".

In column 2, line 36, please change "end" to --and--.

In column 6, line 29, please change "vale" to --valve--.

In column 7, line 50, please change "8" to --a--.

In column 7, line 65, please change "pip" to --pin--.

In column 10, line 56, please change "fluids" to --fluid--.

In column 11, line 24, please delete "said", second occurrence.

In column 11, line 33, please change "end" to --and--.

In column 12, line 10, please insert --a-- after "includes".

Signed and Sealed this

Eleventh Day of November, 1997

Attest:

BRUCE LEHMAN

*Attesting Officer*     *Commissioner of Patents and Trademarks*